(12) United States Patent
Ishiguchi

(10) Patent No.: US 6,925,251 B2
(45) Date of Patent: Aug. 2, 2005

(54) OPTICAL DISC APPARATUS

(75) Inventor: Fusao Ishiguchi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 266 days.

(21) Appl. No.: 10/437,886

(22) Filed: May 15, 2003

(65) Prior Publication Data

US 2004/0013415 A1 Jan. 22, 2004

(30) Foreign Application Priority Data

May 21, 2002 (JP) .......................................... 2002-145949
Apr. 18, 2003 (JP) .......................................... 2003-113521

(51) Int. Cl.[7] ............................................. H04N 5/781
(52) U.S. Cl. ..................... 386/125; 715/500.1; 345/473
(58) Field of Search .......................... 386/45, 46, 125, 386/126; 348/512, 513, 5; 345/473; 715/500.1

(56) References Cited

U.S. PATENT DOCUMENTS 5,479,597 A * 12/1995 Fellous ........................ 345/419
5,831,591 A * 11/1998 Suh ........................... 715/500.1
5,861,880 A * 1/1999 Shimizu et al. ............ 715/500.1
5,861,881 A * 1/1999 Freeman et al. ........... 715/500.1
6,404,978 B1 * 6/2002 Abe ............................ 386/52

FOREIGN PATENT DOCUMENTS

JP 63-20726 1/1988

* cited by examiner

*Primary Examiner*—Andrew Faile
*Assistant Examiner*—Christopher Onuaku
(74) *Attorney, Agent, or Firm*—Morgan, Lewis & Bockius LLP

(57) ABSTRACT

In optical disc apparatus, time data recorded on an optical disc is read out, and a read-out time at this timing is compared with an immediately previous display time. Only when the read-out time is within a time range that is obtained by adding a predetermined time to the immediately previous display time, the display time is updated and the updated display time is output. When the read-out time is outside the time range, the display time is not updated and the immediately previous display time continues to be output. Even in case where the read-out time is outside the predetermined time range, when read-out times are stored a predetermined number of times and time continuity exists in the read-out times, the display time is updated to the latest one of the plural stored read-out times, and the updated display time is output.

4 Claims, 3 Drawing Sheets

| | TRUE TIME (SECOND) | ..... | 8 | 9 | 10 | 11 | 12 | 13 | 14 | 15 | ..... |
|---|---|---|---|---|---|---|---|---|---|---|---|
| PATTERN 1 | READ-OUT TIME (SECOND) | ..... | 8 | 9 | 10 | 11 | 12 | 13 | 14 | 15 | ..... |
| | DISPLAY TIME (SECOND) | ..... | 8 | 9 | 10 | 11 | 12 | 13 | 14 | 15 | ..... |
| PATTERN 2 | READ-OUT TIME (SECOND) | ..... | 8 | 10 | 10 | 11 | 12 | 13 | 14 | 15 | ..... |
| | DISPLAY TIME (SECOND) | ..... | 8 | 10 | 10 | 11 | 12 | 13 | 14 | 15 | ..... |
| PATTERN 3 | READ-OUT TIME (SECOND) | ..... | 8 | 14 | 10 | 11 | 12 | 13 | 14 | 15 | ..... |
| | DISPLAY TIME (SECOND) | ..... | 8 | 8 | 10 | 11 | 12 | 13 | 14 | 15 | ..... |
| PATTERN 4 | READ-OUT TIME (SECOND) | ..... | 8 | 6 | 10 | 11 | 12 | 13 | 14 | 15 | ..... |
| | DISPLAY TIME (SECOND) | ..... | 8 | 8 | 10 | 11 | 12 | 13 | 14 | 15 | ..... |
| PATTERN 5 | READ-OUT TIME (SECOND) | ..... | 3 | 9 | 10 | 11 | 12 | 13 | 14 | 15 | ..... |
| | DISPLAY TIME (SECOND) | ..... | 3 | 3 | 3 | 3 | 3 | 13 | 14 | 15 | ..... |

↑ CERTAIN TIMING (PRESENT TIMING)

OPTICAL DISC APPARATUS

The present disclosure relates to the subject matter contained in Japanese Patent Application No. 2002-145949 filed May 21, 2002 and Japanese Patent Application No. 2003-113521 filed Apr. 18, 2003, which are incorporated herein by reference in their entirety.

BACKGROUND OF THE INVENTION

1. Field of the Invention

The present invention relates to an optical disc apparatus for, from an optical disc on which a digital signal including time data is recorded, demodulating and outputting the digital data, and more particularly to an optical disc apparatus which enables a display device to OSD-display time data while displaying image data.

2. Description of the Related Art

On some of optical discs that are currently used, time data is recorded together with image data. An apparatus (optical disc apparatus) for reproducing such an optical disc reads out digital data recorded on the optical disc while separately reading out image data and time data, and then demodulates the data. The demodulated image data is converted so as to meet the specification such as aspect ratio of a display device on which the image data is to be displayed. Thereafter, the image data and the time data are formed into a composite image of a predetermined format while being synchronized with each other, and the composite image is supplied to the display device. The display device displays an image in which a time based on the time data is OSD-displayed.

In such an optical disc apparatus, it is important to correctly read out information recorded on an optical disc. JP-A-63-20726 discloses a method in which, when an error signal value that is sampled at a certain timing is inadequate, an error signal value that is sampled immediately before the timing is used in place of the error signal value at the certain timing. In this way, the sampling control is always performed to correctly read and write information.

In such an optical disc apparatus, when time data is correctly readout, the true time, the time based on the read-out time data (hereinafter, referred to as "read-out time"), and the time based on the output (displayed) time data (hereinafter, referred to as "display time") always coincide with one another. When the recording face of an optical disc is damaged, for example, there often arises a case where time data cannot be correctly read out. In such a case, time data that is different from the true time is output. Even when the present read-out time lags the previous display time, for example, the present read-out time is set as the display time and output as a new display time, thereby causing the time in the display to reversely progress.

Thus, a conventional optical disc apparatus employs a flow shown in FIG. 4 in a range from extraction of time data to output of the time data. This flow is repeatedly executed during the reproduction.

FIG. 4 shows the flow in the range from extraction of time data to output of the time data.

As shown in FIG. 4, when time data in digital data is read out, the read-out time data (read-out time) is compared with the time data (display time) that is output immediately before the reading (s101→s102). If the read-out time leads the immediately previous display time, the display time is updated to the present read-out time and then output (s103→s104→s106). The display time updated in s104 is fed back to be used as the reference for the subsequent comparison with the read-out time. By contrast, if the read-out time lags the immediately previous display time, the display time is not updated, and the immediately previous display time is maintained to be output (s103→s105→s106).

However, in a conventional optical disc apparatus, when the read-out time that is presently read out leads the display time that is previously output for display, the display time is updated, and the updated display time is output. When the read-out time largely leads the display time, largely led display time is output. When the read-out time leads the previous display time by 1 hour, for example, the display time is updated, and the time which leads the previous display time by 1 hour is output. Even when a read-out time coincident with the true time is thereafter obtained (for example, time data indicating the true time after an elapse of 2 seconds is obtained), the read-out time lags the display time, and the display time is not updated because the display time which largely leads (1 hour in the above case) is output immediately before the reading and the display time is used as the reference. In other words, the display time does not coincide with the true time until the largely led time elapses, and the same time continues to be displayed.

When a time that is largely different from the true time is displayed and the time does not progress for a long time period, the user feels uncomfortable and the time display is meaningless.

SUMMARY OF THE INVENTION

It is an object of the invention to provide an optical disc apparatus in which, even when time data which is largely different from the true time is temporarily read out, influence due to the read-out time can be suppressed in a very short time period and the display time can be made coincident as far as possible with the true time.

In order to attain the object, the optical disc apparatus of the invention comprises: a reading section which reads out image data and time data recorded on an optical disc; a time display image data producing section which produces a time display image data in which a time corresponding to the time data that is read out by the reading section is displayed; and a composite image outputting section which produces a composite image in which a time display image based on the time display image data is superimposed on an image based on the image data that is read out by the reading section, the composite image outputting section outputting the composite image, wherein in the case where the time data that is presently read out by the reading section is within a preset time range preset on the time progressing side with respect to a previous display time, the time display image data producing section produces a time display image data in which a time indicated by the read out time data is displayed, and in the case where a time data that is presently read out by the reading section is outside the preset time range preset on the time progressing side with respect to the previous display time, the time display image data producing section produces a time display image data in which the previous display time is continuously displayed.

According to the configuration, when the present read-out time is outside the preset time range preset on the time progressing side with respect to the previous display time, a time display image data is formed with using the previous display time as the present display time, and then output. When the next read-out time is within the preset time range, the display time is updated to the read-out time, and a time display image data based on the updated display time is formed and then output. When, at this timing, the read-out time is again outside the preset time range with respect to the previous display time, the display time is not updated, and a time display image data is formed with continuously using the previous display time, and then output. Thereafter, the display time is not updated and is maintained until the read-out time becomes within the preset time range, and, only after the read-out time becomes within the preset time range, the display time is updated, and a new time display image data based on the updated display time is formed and then output.

According to another aspect of the invention, in the case where the time data that is presently read out by the reading section is outside the preset time range preset on the time progressing side with respect to the previous display time, the time display image data producing section produces a time display image data in which the previous display time is continuously displayed, stores the time data that are subsequently read out by the reading section over a predetermined time period, and produces a time display image data in which a time indicated by the latest one of the stored time data is displayed when time continuity exists in the stored time data.

According to the configuration, also when the present read-out time is within the preset time range with respect to the previous display time, a plurality of read-out times are stored over the predetermined time period. The read-out times are sequentially checked whether time continuity exists or not. If time continuity exists, the stored read-out times show the true time. Then, the display time is updated with the latest one of the stored read-out times, and a time display image data is formed and output.

According to another aspect of the invention, in the case where the time data that is presently read out by the reading section lags the previous display time, the time display image data producing section produces a time display image data in which the previous display time is continuously displayed.

According to the configuration, in the case where the present read-out time lags the previous display time, the previous display time is maintained, and the time display image data is formed with using the previous display time as the present display time, and then output.

DETAILED DESCRIPTION OF THE PREFFERED EMBODIMENTS

An optical disc apparatus of an embodiment of the invention will be described with reference to the figures.

Figure 1:
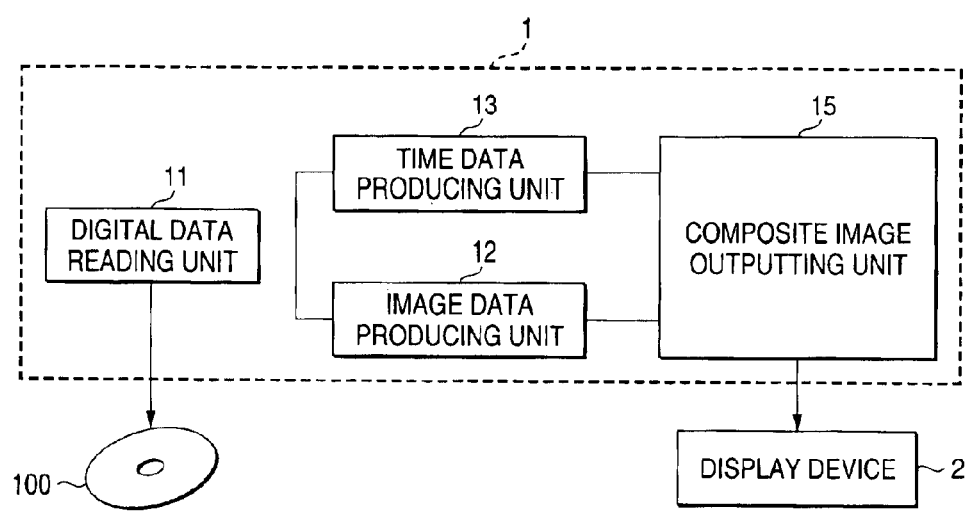
FIG. 1 is a block diagram schematically showing an optical disc apparatus which is an embodiment of the invention.

FIG. 1 is a block diagram schematically showing an optical disc apparatus of the invention.

Figure 2:
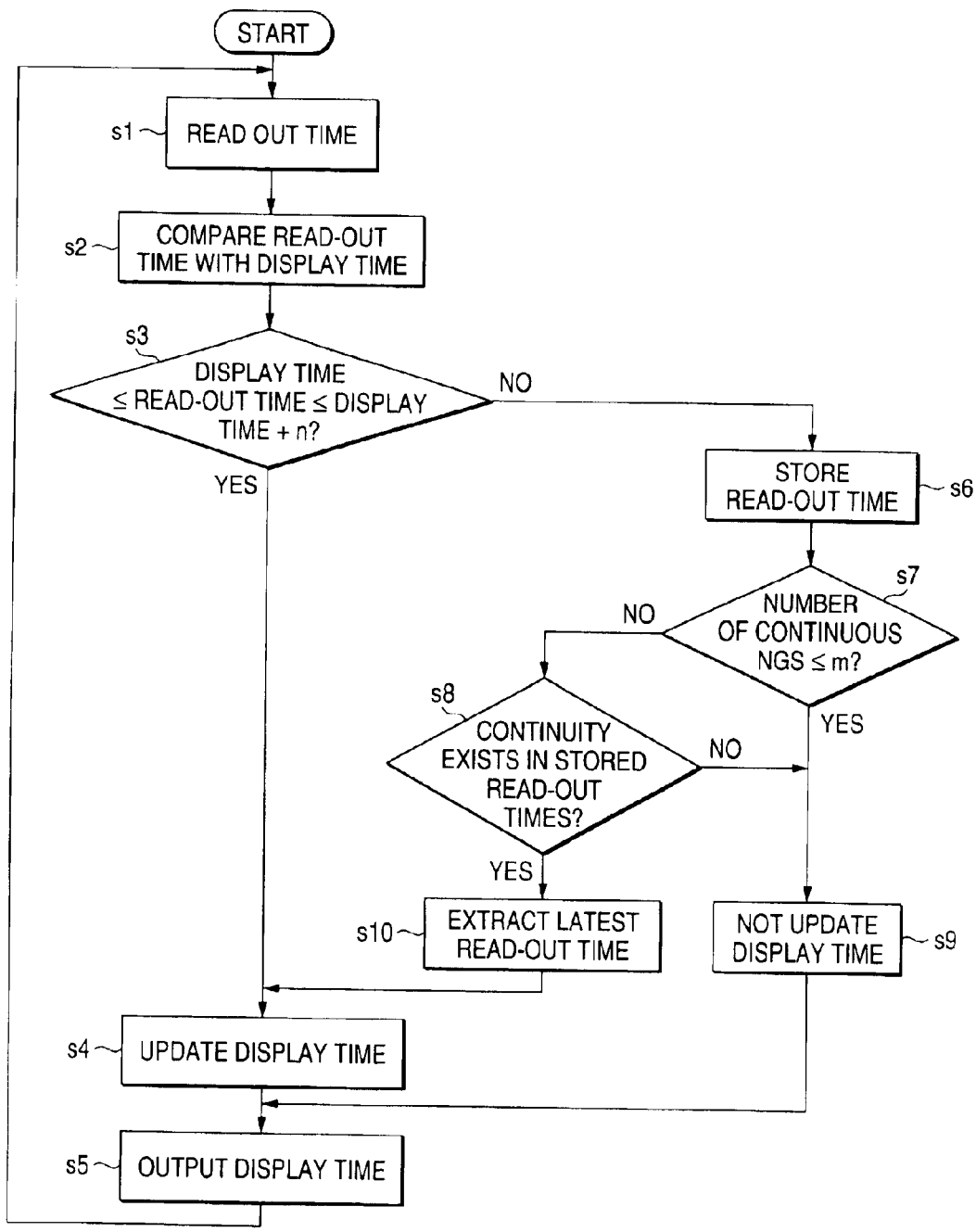
FIG. 2 is a flow chart showing a flow in a range from extraction of time data to updating of the time data in the embodiment of the invention.

FIG. 2 is a flowchart showing a flow in a range from reading of time data to output of the time data. In the figure, n indicates a preset time, and m a preset number of readings.

Figures 3, 4:
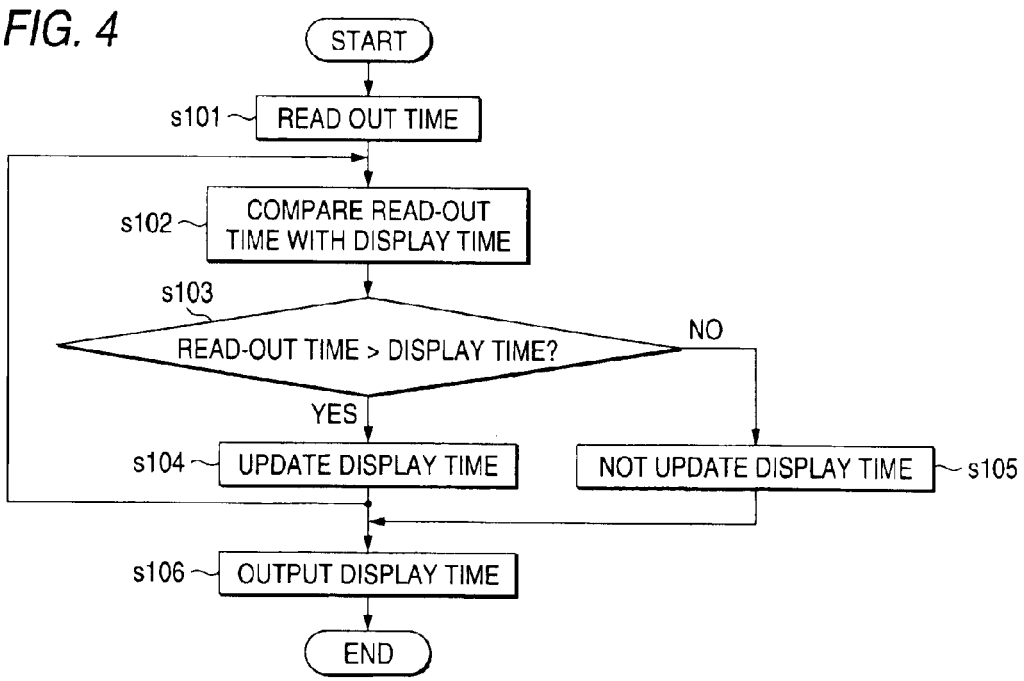
FIG. 3 is a view showing relationships among a true time, an extracted time, and a display time.
FIG. 4 is a flowchart showing a flow in a range from reading of time data to updating of the time data in a conventional art.

FIG. 3 is a view showing relationships among a true time, a read-out time, and a display time.

As shown in FIG. 1, the optical disc apparatus 1 of the embodiment of the invention is connected to a display device 2, reads out data such as image data, audio data, and time data from an optical disc 100, demodulates the data, and then supplies the demodulated data to the display device 2. For example, the optical disc 100 is a VCD, a DVD, or the like.

The optical disc apparatus 1 includes a digital data reading unit 11, an image data producing unit 12, a time data producing unit 13 corresponding to a time display image data producing section in the invention, a composite image outputting unit 15, and an audio data producing unit (not shown).

Digital data such as image data, audio data, and time data are recorded in a predetermined format on the optical disc 100. The digital data reading unit 11 illuminates the recording face of the optical disc 100 with a light beam such as a laser beam, and reads out digital data on the basis of light reflected from the disc. The read-out data are transmitted to the image data producing unit 12, the time data producing unit 13, and the audio data producing unit.

The image data producing unit 12 demodulates image data in the transmitted digital data. The image data producing unit 12 converts the image data so as to meet the specification (the aspect ratio and the like) of a display screen of the display device 2, and supplies the converted data to the composite image outputting unit 15.

The audio data producing unit demodulates audio data in the transmitted digital data, and supplies the demodulated audio data to the display device 2.

The time data producing unit 13 checks the validation of time data in the transmitted digital data by a method, which will be described later, and thereafter supplies the time data to the composite image outputting unit 15.

The composite image outputting unit 15 synchronizes the supplied image and time data with each other, forms a composite image of a predetermined format, and supplies the composite image to the display device 2.

Next, the flow of outputting time data will be described with reference to FIGS. 2 and 3.

In FIG. 3, the read-out time means a time corresponding to time data that is read out at the respective timing. The display time means a time that is displayed on the display device 2 at the timing. That is, the display time means a time that is output from the time data producing unit 13. The flow shown in FIG. 2 is repeatedly executed during reproduction.

As shown in FIG. 2, when digital data is supplied to the time data producing unit 13 at a certain timing, time data in the digital data is read out (s1). The time data (read-out time) is compared with time data (display time) that is output for display immediately before the reading (s2). If the read-out time at a certain timing (present timing) leads the immediately previous display time by a degree which is within a preset time range n (in the embodiment, n=5 seconds), the display time is updated, and the new display time is output (s3→s4→s5). The display time updated in this way is fed back to be used in the comparison with the read-out time at the next timing. By repeating this flow, the display time is sequentially updated and output.

(1) A pattern in which the read-out time is correct and the display time is sequentially updated is shown in pattern 1 of FIG. 3.

In this pattern, the read-out time at a certain timing (the timing of 9 seconds of the true time) is 9 seconds, and the immediately previous display time is 8 seconds. Therefore, the display time is updated, and the new display time is 9 seconds. At the subsequent timings also, the read-out time continues to be coincident with the true time, and hence the true time and the display time always coincide with each other. When the read-out time is correct, therefore, the true time, the read-out time, and the display time progress while these times are coincident with one another as shown in pattern 1 of FIG. 3.

(2) Next, relationships between the read-out time and the display time in the case where the read-out time at only one certain timing leads from the immediately previous display time by a degree which is within a preset time range n (5 seconds) and differs from the true time are shown in pattern 2 of FIG. 3.

In the case where the read-out time at a certain timing (the timing of 9 seconds of the true time in FIG. 3) is 10 seconds because of influence due to a scratch, dirt, or the like on the surface of the optical disc, as shown in the flowchart of FIG. 2, the display time is updated to 10 seconds because the read-out time at the present timing is within the preset time range (within 5 seconds), and the new display time is output (s3→s4→s5). The display time is fed back to be compared with the next read-out time.

When, at 10 seconds of the true time, the read-out time is 10 seconds, the read-out time is within the preset time range, and hence the display time is updated and then output (s3→s4→s5).

By executing the flow described above, although the display time is temporarily different from the true time, the difference between the display time and the true time is very small, and the display time can immediately coincide with the true time. Even when the read-out time is temporarily different from the true time, therefore, the time display can be performed without causing the user to feel uncomfortable.

In this example, the read-out time is different only at one timing from the true time. Even when the read-out time is continuously different from the true time, the display time can be returned so as to coincide with the true time by using the same flow, as far as it is not more than the preset number of readings.

(3) Next, the case where, as shown in pattern 3 of FIG. 3, the read-out time at a certain timing leads the immediately previous display time by a degree which is larger than the preset time range (5 seconds) will be described (the case where the read-out time is outside the preset time range will be described).

In the case where the read-out time at a certain timing (the timing of 9 seconds of the true time) is 14 seconds, as shown in pattern 3 of FIG. 3, the read-out time leads by a degree which is outside the preset time range n (5 seconds), and hence the read-out time is stored (s3→s6). At this point of time, since only one timing has been outside of the preset time range and it has not exceeded the preset number of readings m (5 times), the display time is not updated, and the immediately previous display time (8 seconds) is used as it is (s7→s9→s5). When, at the next timing (10 seconds of the true time), the read-out time coincides with the true time or is 10 seconds, the read-out time is within the predetermined time range, and hence the display time is updated and then output (s3→s4→s5). In this case, the progress of the display time is temporarily suspended, but the time period of suspension can be set to be very short. Even when the read-out time is temporarily different from the true time, therefore, the time display can be performed without causing the user to feel uncomfortable.

Next, the case where the read-out time at a certain timing lags the immediately previous display time, as shown in pattern 4 of FIG. 3

As shown in pattern 4 of FIG. 3, when the read-out time (6 seconds) at certain timing lags the immediately previous display time (8 seconds), the read-out time is outside the preset time range and the read-out time is stored (s3→s6) At this point of time, since only one timing has been outside of the preset time range and it has not exceeded the preset number of readings m (5 times), the display time is not updated, and the immediately previous display time (8 seconds) is used as it is (s7→s9→s5). When, at the next timing (10 seconds of the true time), the read-out time is 10 seconds, the read-out time is within the preset time range, and hence the display time is updated and then output (s3→s4→s5).

By executing the flow described above, even when the read-out time lags, the immediately previous time is again displayed and the subsequent read-out time is used for updating the display time, the display time can immediately coincide with the true time. Even when the read-out time is temporarily different from the true time, therefore, the time display can be performed without causing the user to feel uncomfortable.

(5) Next, the case where, as shown in pattern 5 of FIG. 3, the read-out time at a certain timing leads the immediately previous display time by a degree which is larger than the preset time range (5 seconds), and a plurality of read-out times that are subsequently read out have time continuity will be described. That is, the case where the read-out time and the display time has already been different from the true time will be described.

The case where, as shown in pattern 5 of FIG. 3, the read-out time at a certain timing (the timing of 9 seconds of the true time) is 9 seconds and the immediately previous display time is 3 seconds will be considered. Since the read-out time at the present timing leads the immediately previous display time by a degree which is outside the time range (5 second), the read-out time is temporarily stored (s3→s6). At this point of time, since only one timing has been outside of the preset time range and it has not exceeded the preset number of readings m (5 times), the display time is not updated, and the immediately previous display time is used as it is (s7→s9→s5). When a read-out time that leads by a degree which is outside the predetermined time range is thereafter obtained at timings of 10, 11, 12, and 13 seconds of the true time, the read-out times at the timings are stored (s3→s6). When the number of continuous occurrences of such a leading situation exceeds the preset number of readings m (5 times), it is ascertained that time continuity exists the stored read-out times (s7→s8). In the ascertaining of time continuity, it is ascertained whether the stored read-out times sequentially progress along the time series by the same interval or not. If time continuity exists as shown in pattern 5 of FIG. 3, the display time is updated to the latest one of the read-out times at this timing (s8→s10→s4). The updated display time is output and fed back to be used in the comparison with the read-out time at the next timing. If time continuity does not exist, the display time is not updated, and the previous display time is output as it is (s8→s9→s5).

In the embodiment, the time range for updating the display time is set to 5 seconds. As the display time which does not cause the user to feel uncomfortable, about 10 seconds can be set. The number of read-out times which are outside the preset time range (number of readings) can be set to any number at which the time reading process can be performed within the preset time range. In the case where the preset time range is 10 seconds and time data is read out at intervals of 1 second, for example, the number can be set to 10 or less.

In the configuration described above, when the time range and the number (time) of storing read-out times are adequately set, it is possible to configure an optical disc apparatus in which, even when the read-out time cannot be correctly obtained because of a scratch of the surface of an optical disc or another cause and a display time that is different from the true time is temporarily output, the display time can be corrected in a very short time period so as to display the true time.

According to the invention, the read-out time at a certain timing is compared with the immediately previous display time, and if the read-out time is within a preset time range that is obtained by adding a predetermined time to the immediately previous display time, the display time is updated and output. And if the read-out time is outside the preset time range, the display time is not updated and the immediately previous display time is output as it is. Thus, an optical disc apparatus can be configured in which, even when a time that is different from the true time is temporarily displayed, the display time can be corrected in a very short time period so as to display the true time. Therefore, the time display can be performed without causing the user to feel uncomfortable.

According to the invention, even in the case where the read-out time at a certain timing is compared with the immediately previous display time and the read-out time is outside a time range that is obtained by adding a predetermined time to the immediately previous display time, when read-out times which are read out a predetermined number of times after the certain timing have time continuity, the display time is updated to the latest one of the read-out times and then output, whereby time data can be easily corrected so as to display the true time.

According to the invention, in the case where the read-out time at a certain timing is compared with the immediately previous display time and the read-out time lags the previous display time, the display time is not updated, and the immediately previous display time is output as it is, and, only in the case where the read-out time leads the immediately previous display time and is within a predetermined time range, the display time is updated and then output. Therefore, time data can be easily corrected so as to display the true time.

What is claimed is:

1. An optical disc apparatus comprising:
    a reading section which reads out image data and time data recorded on an optical disc;
    a time display image data producing section which produces a time display image data in which a time corresponding to the time data that is read out by the reading section is displayed; and
    a composite image outputting section which produces a composite image in which a time display image based on the time display image data is superimposed on an image based on the image data that is read out by the reading section, the composite image outputting section outputting the composite image,
    wherein in the case where the time data that is presently read out by the reading section is within a preset time range preset on the time progressing side with respect to a previous display time, the time display image data producing section produces a time display image data in which a time indicated by the read out time data is displayed,
    in the case where a time data that is presently read out by the reading section is outside the preset time range preset on the time progressing side with respect to the previous display time, the time display image data producing section produces a time display image data in which the previous display time is continuously displayed, stores the time data that are subsequently read out by the reading section over a predetermined time period, and produces a time display image data in which a time indicated by the latest one of the stored time data is displayed when time continuity exists in the stored time data, and
    in the case where a time data that is presently read out by the reading section lags the previous display time, the time display image data producing section produces a time display image in which the previous display time is continuously displayed.

2. An optical disc apparatus comprising:
    a reading section which reads out image data and time data recorded on an optical disc;
    a time display image data producing section which produces a time display image data in which a time corresponding to the time data that is read out by the reading section is displayed; and
    a composite image outputting section which produces a composite image in which a time display image based on the time display image data is superimposed on an image based on the image data that is read out by the reading section, the composite image outputting section outputting the composite image,
    wherein in the case where the time data that is presently read out by the reading section is within a preset time range preset on the time progressing side with respect to a previous display time, the time display image data producing section produces a time display image data in which a time indicated by the read out time data is displayed, and
    in the case where a time data that is presently read out by the reading section is outside the preset time range preset on the time progressing side with respect to the previous display time, the time display image data producing section produces a time display image data in which the previous display time is continuously displayed.

3. An optical disc apparatus according to claim 2, wherein, in the case where the time data that is presently read out by the reading section is outside the preset time range preset on the time progressing side with respect to the previous display time, the time display image data producing section produces a time display image data in which the previous display time is continuously displayed, stores the time data that are subsequently read out by the reading section over a predetermined time period, and produces a time display image data in which a time indicated by the latest one of the stored time data is displayed when time continuity exists in the stored time data.

4. An optical disc apparatus according to claim 2, wherein in the case where the time data that is presently read out by the reading section lags the previous display time, the time display image data producing section produces a time display image data in which the previous display time is continuously displayed.

* * * * *